US011288314B2

(12) United States Patent
Pereira et al.

(10) Patent No.: US 11,288,314 B2
(45) Date of Patent: Mar. 29, 2022

(54) METHOD AND APPARATUS FOR MULTI-DIMENSIONAL CONTENT SEARCH AND VIDEO IDENTIFICATION

(71) Applicant: Roku, Inc., San Jose, CA (US)

(72) Inventors: Jose Pio Pereira, Cupertino, CA (US); Mihailo M. Stojancic, San Jose, CA (US); Shashank Merchant, Sunnyvale, CA (US)

(73) Assignee: ROKU, INC., San Jose, CA (US)

( * ) Notice: Subject to any disclaimer, the term of this patent is extended or adjusted under 35 U.S.C. 154(b) by 483 days.

(21) Appl. No.: 16/442,414

(22) Filed: Jun. 14, 2019

(65) Prior Publication Data

US 2020/0004782 A1    Jan. 2, 2020

Related U.S. Application Data

(63) Continuation of application No. 16/240,859, filed on Jan. 7, 2019, now Pat. No. 10,977,307, which is a
(Continued)

(51) Int. Cl.
*G06F 16/00* (2019.01)
*G06F 16/783* (2019.01)
(Continued)

(52) U.S. Cl.
CPC .......... *G06F 16/7837* (2019.01); *G06F 16/71* (2019.01); *G06F 16/7847* (2019.01);
(Continued)

(58) Field of Classification Search
CPC ............. G06F 16/7837; G06F 16/7847; G06F 16/7854; G06F 16/71
See application file for complete search history.

(56) References Cited

U.S. PATENT DOCUMENTS 5,550,933 A    8/1996  Stetten
5,819,286 A   10/1998  Yang et al.
(Continued)

OTHER PUBLICATIONS

Chang et al. "A Fully Automated Content-Based Video Search Engine Supporting Spatiotemporal Queries," IEEE Transactions on Circuits and Systems for Video Technology, vol. 8, No. 5, Sep. 1998, pp. 602-615. (Year: 1998).*
(Continued)

*Primary Examiner* — Cheryl Lewis
(74) *Attorney, Agent, or Firm* — McDonnell Boehnen Hulbert & Berghoff LLP

(57) ABSTRACT

A multi-dimensional database and indexes and operations on the multi-dimensional database are described which include video search applications or other similar sequence or structure searches. Traversal indexes utilize highly discriminative information about images and video sequences or about object shapes. Global and local signatures around keypoints are used for compact and robust retrieval and discriminative information content of images or video sequences of interest. For other objects or structures relevant signature of pattern or structure are used for traversal indexes. Traversal indexes are stored in leaf nodes along with distance measures and occurrence of similar images in the database. During a sequence query, correlation scores are calculated for single frame, for frame sequence, and video clips, or for other objects or structures.

20 Claims, 13 Drawing Sheets

AD: Associated Indexes and Information

Related U.S. Application Data continuation of application No. 15/290,364, filed on Oct. 11, 2016, now Pat. No. 10,210,252, which is a continuation of application No. 15/078,056, filed on Mar. 23, 2016, now Pat. No. 9,489,455, which is a continuation of application No. 13/432,914, filed on Mar. 28, 2012, now Pat. No. 9,323,841, which is a continuation of application No. 12/141,337, filed on Jun. 18, 2008, now Pat. No. 8,171,030.

(60) Provisional application No. 60/944,668, filed on Jun. 18, 2007.

(51) Int. Cl.
| | |
|---|---|
| G06F 16/71 | (2019.01) |
| G06F 16/901 | (2019.01) |
| G06K 9/00 | (2022.01) |
| G06T 7/11 | (2017.01) |
| G06T 7/12 | (2017.01) |
| G06T 7/162 | (2017.01) |
| G06T 7/10 | (2017.01) |

(52) U.S. Cl.
CPC ...... *G06F 16/7854* (2019.01); *G06F 16/9014* (2019.01); *G06K 9/00711* (2013.01); *G06K 9/00718* (2013.01); *G06K 9/00758* (2013.01); *G06T 7/10* (2017.01); *G06T 7/11* (2017.01); *G06T 7/12* (2017.01); *G06T 7/162* (2017.01); *G06K 2009/00738* (2013.01); *G06T 2207/10016* (2013.01); *G06T 2207/20021* (2013.01)

(56) References Cited

U.S. PATENT DOCUMENTS

| | | | |
|---|---|---|---|
| 5,819,288 | A | 10/1998 | De Bonet |
| 5,848,416 | A | 12/1998 | Tikkanen |
| 7,010,159 | B2 | 3/2006 | Ali |
| 7,039,633 | B1 | 5/2006 | Dey et al. |
| 7,072,891 | B2 | 7/2006 | Lee et al. |
| 7,088,845 | B2 | 8/2006 | Gu et al. |
| 7,184,100 | B1 | 2/2007 | Wilf et al. |
| 7,216,290 | B2 | 5/2007 | Goldstein et al. |
| 7,246,314 | B2 | 7/2007 | Foote et al. |
| 7,477,739 | B2 | 1/2009 | Haitsma et al. |
| 7,519,835 | B2 | 4/2009 | Koyfman |
| 7,809,154 | B2 | 10/2010 | Lienhart et al. |
| 7,856,226 | B2 | 12/2010 | Wong et al. |
| 7,895,193 | B2 | 2/2011 | Cucerzan et al. |
| 8,171,030 | B2 | 5/2012 | Pereira et al. |
| 8,488,836 | B2 | 7/2013 | Brunk et al. |
| 9,323,841 | B2 | 4/2016 | Pereira et al. |
| 9,489,455 | B2 | 11/2016 | Pereira et al. |
| 10,210,252 | B2 | 2/2019 | Pereira et al. |
| 2004/0189863 | A1 | 9/2004 | Gu et al. |
| 2004/0221237 | A1 | 11/2004 | Foote et al. |
| 2005/0089091 | A1 | 4/2005 | Kim et al. |
| 2005/0141707 | A1 | 6/2005 | Haitsma et al. |
| 2006/0041533 | A1 | 2/2006 | Koyfman |
| 2008/0261593 | A1 | 10/2008 | Wong et al. |
| 2009/0089587 | A1 | 4/2009 | Brunk et al. |
| 2009/0324199 | A1 | 12/2009 | Haitsma et al. |
| 2016/0275084 | A1 | 9/2016 | Pereira et al. |

OTHER PUBLICATIONS

Kuo et al., "A Content-Based Query Language for Video Databases," Proceedings of Multimedia '96, IEEE 1996, p. 209-214. (Year: 1996).*

Bay, H., et al., "SURF: Speeded up Robust Features", "Computer Vision and Image Understanding", 2006, pp. 346-359, vol. 110, No. 3.

Cheung, S., et al., "Efficient Video Similarity Measurement With Video Signature", "IEEE Transactions on Circuits and Systems for Video Technology", Jan. 2003, pp. 59-74, vol. 13, No. 1.

Haitsma, J., et al., "Robust Audio Hashing for Content Identification", "International Workshop on Content-Based Multimedia Indexing", Sep. 19, 2001, pp. 117-124, vol. 4.

Hoad, T., et al., "Fast Video Matching with Signature Alignment", "MIR '03: Proceedings of the 5th ACM SIGMM International Workshop on Multimedia Information Retrieval", Nov. 7, 2003, pp. 262-269.

Hoad, T., et al., "Detection of Video Seqeuences Using Compact Signatures", "ACM Transactions on Information Systems", Jan. 2006, pp. 1-50, vol. 24, No. 1.

Leibe, B., et al., "Pedestrian Detection in Crowded Scenes", "Computer Vision and Pattern Recognition, CVPR 2005, IEEE Computer Society Conference", Jun. 20-25, 2005, pp. 878-888, vol. 1.

Lowe, D., "Distinctive Image Features from Scale-Invariant Keypoints", "International Journal of Computer Vision", Jan. 5, 2004, pp. 91-110, vol. 60, No. 2.

Peng, Y., et al., "Clip-Based Similarity Measure for Hierarchical Video Retrieval", "MIR '04: Proceedings of the 6th ACM SIGMM International Workshop on Multimedia Information Retrieval", Oct. 15-16, 2004.

Ren, X., et al., "Learning a Classification Model for Segmentation", "Proceedings of the Ninth IEEE International Conference on Computer Vision", Oct. 13-16, 2003, pp. 10-17, vol. 1.

Seemann, E., et al., "An Evaluation of Local Shape-Based Features for Pedestrian Detection", "British Machine Vision Conference (BMVC)", 2005, pp. 34-43.

Sivic, J., et al., "Video Google: A Text Retrieval Approach to Object Matching in Videos", "Proceedings of the Ninth IEEE International Conference on Computer Vision", Oct. 13-16, 2003, pp. 1470-1477, vol. 2.

Non-Final Office Action for U.S. Appl. No. 12/141,337 dated Jan. 5, 2011.

Notice of Allowance for U.S. Appl. No. 12/141,337 dated Dec. 30, 2011.

Non-Final Office Action for U.S. Appl. No. 13/432,914 dated Dec. 28, 2012.

Final Office Action for U.S. Appl. No. 13/432,914 dated Aug. 20, 2013.

Non-Final Office Action for U.S. Appl. No. 13/432,914 dated Jan. 21, 2015.

Notice of Allowance for U.S. Appl. No. 13/432,914 dated Dec. 29, 2015.

Notice of Allowance for U.S. Appl. No. 15/078,056 dated Jul. 18, 2016.

Non-Final Office Action for U.S. Appl. No. 15/290,364 dated Jun. 19, 2017.

Non-Final Office Action for U.S. Appl. No. 15/290,364 dated Jan. 23, 2018.

Notice of Allowance for U.S. Appl. No. 15/290,364 dated Sep. 24, 2018.

Supplemental Notice of Allowance for U.S. Appl. No. 15/290,364 dated Nov. 8, 2018.

* cited by examiner

AD: Associated Indexes and Information

AD: Associated Indexes and Information

TF: Term Frequency
IDF: Inverse Document Frequency
DB: Database

METHOD AND APPARATUS FOR MULTI-DIMENSIONAL CONTENT SEARCH AND VIDEO IDENTIFICATION

The present application is a continuation of U.S. patent application Ser. No. 16/240,859, filed on Jan. 7, 2019; which is a continuation of U.S. patent application Ser. No. 15/290,364, filed on Oct. 11, 2016 and issued as U.S. Pat. No. 10,210,252; which is a continuation of U.S. patent application Ser. No. 15/078,056, filed on Mar. 23, 2016 and issued as U.S. Pat. No. 9,489,455; which is a continuation of U.S. patent application Ser. No. 13/432,914, filed on Mar. 28, 2012 and issued as U.S. Pat. No. 9,323,841; which is a continuation of U.S. patent application Ser. No. 12/141,337, filed on Jun. 18, 2008 and issued as U.S. Pat. No. 8,171,030; and which claims the benefit of U.S. Provisional Patent Application No. 60/944,668 entitled "Methods and Apparatus for Multi-dimensional Content Search", filed on Jun. 18, 2007, which are all incorporated by reference herein in their respective entireties.

CROSS REFERENCE TO RELATED APPLICATION

U.S. patent application Ser. No. 12/141,163 entitled "Method and Apparatus for Providing a Scalable Identification of Digital Video Sequences" filed on Jun. 18, 2008, issued as U.S. Pat. No. 8,229,227, and having the same assignee as the present application is a related application and hereby incorporated by reference.

FIELD OF THE INVENTION

The present invention generally relates to information retrieval systems including systems related to complex objects, multi-dimensional data, rich media, and video.

BACKGROUND OF THE INVENTION

Natural information can best be described by multi-dimensional feature vectors. For example, to identify objects, or video sequences, or bio-molecular structures, or detect actions and behavior, a multi-dimensional search is required on measurements or features of the object or structure or sequence that is detected. Some of the video identification approaches use motion signatures derived from detected motion between frames of a video sequence or description of patches, analogous to visual words, in each frame. Motion signatures for a video sequence can be extracted by using statistical data or object tracking. Another popular method uses a bag of words approach to describe any image or sequence. Such an approach describes the regions around a keypoint or selected patches in a frame as words and hence the information of a frame or video sequence may be indexed on a word by word basis. This approach uses a keypoint detection algorithm to detect points of interest and describe a patch around this keypoint. A well known implementation is the scale invariant feature transform (SIFT) algorithm which uses scale invariant keypoint detection and signature values for an area around the keypoint. Another recent algorithm for detecting keypoints or points of interest is the "Speeded Up Robust Features" (SURF) algorithm. Selected patches may be tracked and connected by visual tubes between frames in some implementations. Visual tubes are abstract tubes connecting the same object across multiple frames. Other video search approaches use color histograms to describe an image or image sequence. However, such approaches do not include unique information about each video and are not generally accurate. The other drawbacks of conventional video search approaches are the size and complexity of the individual signatures generally used, and the absence of an indexing system for these complex signatures. Together these drawbacks impact the size of databases and performance of searching for video sequences through multi-dimensional databases.

Current retrieval systems are generally based on massive parallelization. Documents are organized as one dimensional inverted lists. In a large database with 100 billion (B) documents, a one dimensional inverted index may list as many as 1-10B documents. Further, a multi-dimensional query with 10 inputs will require analysis of all the associated documents listed. This complexity impacts the update time to update new entries into the database, query performance, and thoroughness of querying. Current systems usually need to limit the size of associated documents for practical reasons. As a consequence, all the documents in a database are not generally evaluated. To limit the impact of the above issue on accuracy and performance, most current solutions rely on a technique for dividing the database into smaller sections and then evaluating a few of these sections resulting in better accuracy and performance, but such a techniques are impacted by the size of inverted list documents, and the accuracy is still limited.

SUMMARY OF THE INVENTION

In one or more of its several aspects, the present invention addresses problems such as those described above. For example, in video identification, traversal indexes are derived from a global shape signature or signatures of selected frames in the video sequence, and from the local signatures of prominent objects, or keypoints identified in the video sequence, or from signatures derived from detected motion between video frames in a sequence. In general, the architecture includes associated data and differentiating indexes at the leaf node.

One embodiment of the invention addresses a method of organization of a multi-dimensional video or object database using a compact hash or pivot value multi-dimensional vector signature as a traversal index. A robust hash is generated as a traversal index from multiple parameters extracted from a region of interest or keypoint in a frame or from a frame of a video sequence. Multiple associated data or signatures are stored at a leaf node.

Another embodiment of the invention addresses a method to post process signatures and associated data between a video sequence of interest or an object region associated with a query object or a video sequence to increase accuracy and confidence of a video sequence match. The distance between the signatures of the query and original video features including a region around a keypoint, or an object or a frame is calculated. Changes in signatures are correlated between a query and a database entry for a matching frame, object, or structure to provide a factor in the sequence correlation score. A sequence correlation in time is provided using differences in frame numbers between pairs of matching query and original video signatures.

Another embodiment of the invention addresses a method of generating a likelihood score for a pair of query frames or regions and correlating between matching frames of a query video and an original video. A correlation score is generated based on an individual frame similarity score. A time correlation is generated using relative differences in frame numbers of the original video and the query video. A correlation between the original video and the query video is generated by using a change in signatures of each sequence of frames in the query video and in the original video, wherein the original video is an entry in a video database.

Another embodiment of the invention addresses a method to convert documents or activity such as online user session information or any natural event or activity into multi-dimensional vectors. Documents, events, and activity for learning by inference are classified by a multi-dimensional vector. Certain behavior or next state in an activity are expected, wherein the expected next state or the certain behavior is generated by a decision tree or a rule based system that takes as an input one or more identified documents or classifications.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

Figure 1A:
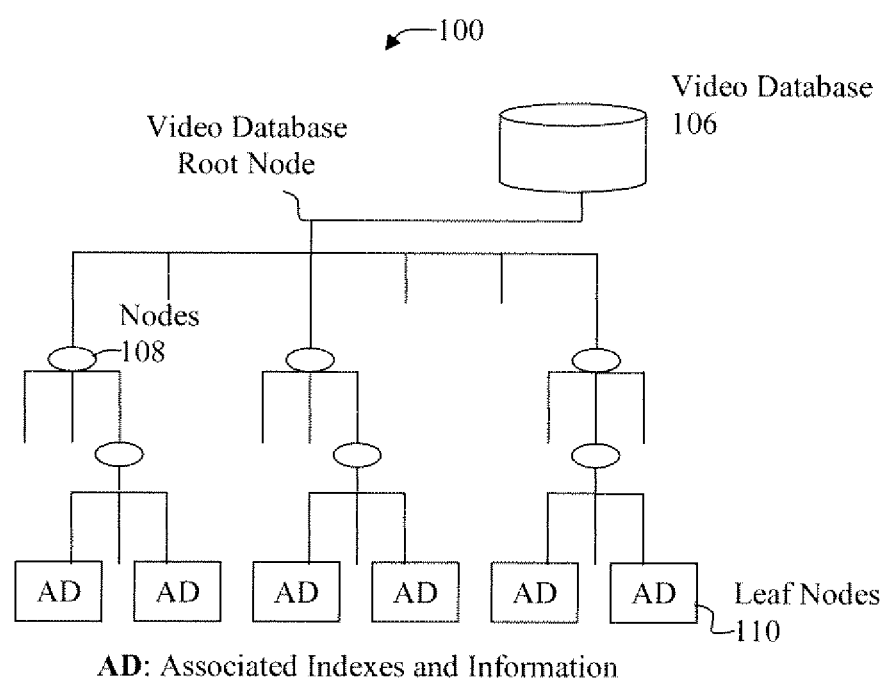
FIG. 1A illustrates a hierarchical representation of a multi-dimensional object or video database with traversal nodes constructed from differentiating parts of traversal indexes and the leaf nodes storing associated data and associated indexes.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-usable storage medium having computer-usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein.

A general-purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

FIG. 1A illustrates a hierarchical representation 100 of a multi-dimensional object or video database with traversal nodes constructed from differentiating parts of traversal indexes and leaf nodes storing associated data and associated indexes. In FIG. 1A, a traversal index associated with elements, such as video sequences 104, stored in a multi-dimensional video database 106, and leaf nodes 110. The video database is traversed via nodes 108 to reach the leaf nodes 110 storing associated data and associated indexes. The traversal indexes store differentiating information between different video frames. A typical video database is indexed as a hierarchy and the nodes of interest are traversed from top root node to the leaf nodes.

An alternate method of indexing avoids tree traversal altogether and accesses the leaf node directly. This indexing is done by generating a direct address or hash for each leaf node.

In a preferred embodiment, the traversal indexes are a direct address or a hash to each leaf node. In this embodiment, all the traversal indexes are equivalent to the hash or direct address of the leaf node.

A hash is computed from various features of a detailed signature of the information within a region of interest. One embodiment would divide a region of interest into sixteen sectors. Energy associated with each sector are added together providing a total energy for the sector. The total energy of the sector is compared to a threshold value to generate a hash bit value for the sector. With sixteen sectors, a sixteen bit hash value is created. Other features associated with each sector may also be used to generate additional bits for the hash value. Various combinations of hash bits may also be used. A robust hash is defined by a selection of the information and threshold utilized such that the calculated hash value is more immune to noise and disturbances due to distortion in a query video as compared to the original video.

The traversal index in one embodiment is a shape signature which may be generated using a histogram of sectored rings around the center point, chosen at a keypoint. The radius of the rings can be selected by equal divisions of the radius of the entire region, or using log-polar radius values, or variants combining log and equal divisions. In log-polar radius calculations, the radius of each larger ring will increase as a multiple of a factor. A keypoint is selected using a difference of Gaussian (DoG) method or the Hessian-Laplace method which are known methods used in image processing. A known implementation is the scale invariant feature transform (SIFT) algorithm which uses scale invariant keypoint detection and signature values for an area around the keypoint as discussed by Josef Sivic and Andrew Zisserman, "Video Google: A Text Retrieval Approach to Object Matching in Videos", Proceedings of the international Conference on Computer Vision, October 2003, pg. 1470-1477 and by David G. Lowe, "Distinctive Image Features from Scale-Invariant Keypoints", International Journal of Computer Vision, 60, 2, 2004, pg. 91-110 and both incorporated by reference herein in their entirety. Another recent algorithm for detecting keypoints or points of interest is the "Speeded Up Robust Features" (SURF) as presented by Herbert Bay, Tinne Tuytelaars, Luc Van Gool, "SURF: Speeded Up Robust Features", Proceedings of the ninth European Conference on Computer Vision, May 2006 pg 404-417 and incorporated by reference herein in its entirety. Alternatively, other corner or keypoint detection algorithms may be used. In another embodiment, a compact signature may be used based on a single bit, or multiple bits to represent each histogram bin, where each bin represents a sector of rings within the region of interest. This approach generates a compact signature that can be evaluated quickly, and is suitable for use with a very large database.

An important step in video identification is selection of frames for extraction of features. This step is primarily used to reduce the size of database and optimize the uniqueness of database information. Video frames can be selected by a few methods known in industry or further optimized versions of the basic methods. The information within a sequence of video frames changes based on a rate of change of action or on scene changes. The information of changes from frame to frame can be measured by different means. One known method is to use the sum of mean arithmetic differences (MAD) between frames. The sum of differences between frames can be used as a controlling signal. Frames can be selected by using the minima or maxima within a sliding window and the selected frames can then used for feature extraction.

An alternate method of selecting frames may be performed on a compressed video stream itself. The rate of information change can be tracked by various means including the sum of differences of the change in frames as well as the number of bytes to indicate the changes.

Another alternate method would track objects in a compressed video and select frames when the object motion is at minima or maxima or at both minima and maxima.

In another embodiment, a traversal index is generated by combining two subsequent signatures of selected frames. For example, a combined sequence signature may be generated representing two subsequent signatures. Using the content of two frames makes the combined sequence signatures highly unique and distinguishable from other sequences in the video database.

In another embodiment, a shape signature could be based on a combined set of histograms. Each set of histograms is generated for each keypoint or critical point on contours. Here the orientation considered for histograms would be based on a perpendicular orientation to the maximum gradient or be based on a line of the strongest contour near the keypoint.

The signature generation process includes:
a) finding an orientation at each keypoint;

b) selecting an orientation axis based on the maximum of any parameter including sum of first order gradient, or second order gradient at a keypoint;

c) dividing the area around the keypoint into sectors and rings and using the orientation axis as the reference axis;

d) generating histograms around the keypoint; and e) generating signatures for each keypoint.

Alternatively, in another embodiment, the signature generation process is as follows:

a) selecting points to generate signatures based on another criteria, such as detection of object or bounding boxes of an object, and using weighted values on the contours within the selected region; and b) generating a histogram for the each of the identified regions of interest and generating a shape signature for the entire set of signatures.

Alternatively, in another embodiment, the signature generation process is as follows:

a) generating signature information in the selected region of interest by a weighted combination of various features detected in each region;

b) the features detected in each region can include the following:
  i. intensity gradient,
  ii. phase correlation between pixels on the contour,
  iii. good continuation of contours,
  iv. texture classification,
  v. color similarity, and
  vi. second order gradient;

c) obtain the first and second order coefficients to create a weight for each feature that achieves optimal recall or another quality of metric such as product of recall and inverse precision; and alternately, if the features provide better recall or quality of metric (recall times inverse precision) when they are used separately rather than combined in a single output, multiple signatures need to be created for the selected features or set of combined features.

In another embodiment, a multi-dimensional compact signature is generated by the following steps:

a. for a region of interest, a new image is created that sums up the features extracted at each pixel and a calculated pixel value is generated;

b. the same region of interest is divided into sectors;

c. the features for each region are evaluated in the following ways:
  i) by a calculated sum of features in a sector,
  ii) by a calculated sum of energies in the x and y direction,
  iii) by a calculated gradient of energies in the x and y directions.

In another embodiment, the signature generation process is as follows:

a) for a region of interest, a weighted sum of each feature at a pixel is used to generate an output pixel; and b) weights for each feature are computed based on the most optimal solution. The metric for the most optimal solution is based on the product of recall and inverse precision.

In another embodiment the traversal index is generated using the signatures in above methods.

In another embodiment the traversal index combines bits generated from a set of weighted feature outputted pixel region images.

In another embodiment, each of the leaf nodes 110 in FIG. 1A having the associated data and indexes could also include texture information or object location and size information.

In a preferred embodiment, a global shape signature that highlights local features around an object is used to generate a signature for a frame. In one embodiment, this method is used to generate multiple signature candidates. From among these multiple candidates, one or more of these local objects or area-based shape signatures are selected when a term frequency (TF), as described in further detail below with regard to FIG. 5, for the particular global signature is large indicating that the signature is not very unique.

The term frequency (TF) herein represents the number of times a given term appears in that document. This count is usually normalized to prevent a bias towards longer documents, which may have a higher term frequency regardless of the actual importance of that term in the document.

The inverse document frequency (IDF) is a measure of the general importance of a term which is obtained by dividing the number of all documents by the number of documents containing the term, and then taking the logarithm of that quotient.

In another embodiment, the shape signature is based on an extracted object using image segmentation and motion correlation methods and excludes surrounding background information. Motion segmentation generally describes the methods that use motion of an object in a sequence of images or video to separate the object from the rest of the image.

Figure 1B:
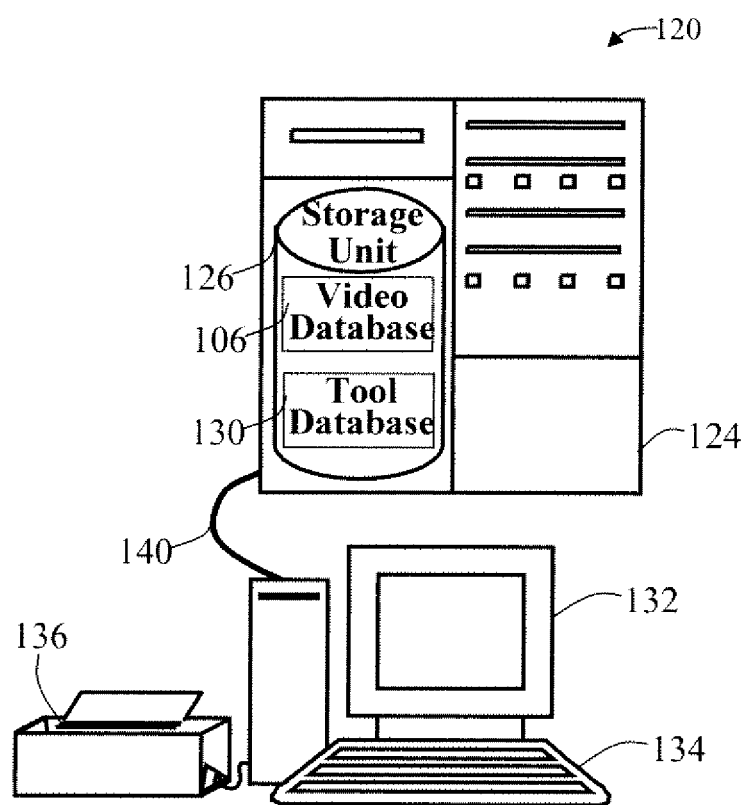
FIG. 1B illustrates a multi-dimensional content search system in accordance with the present invention.

FIG. 1B illustrates a multi-dimensional content search system 120 in accordance with an embodiment of the present invention. The multi-dimensional content search system 120 may suitably include a processor 124, a storage unit 126 for storing a video database 106, a tools database 130, and the like. The processor 124 may be closely coupled with a monitor 132, keyboard 134, and printer 136 over interface 140. Alternatively, the monitor 132, keyboard 134, and printer 136 may be part of a workstation which is loosely coupled to the processor 124 over interface 140. Interface 140 may include a connection to the Internet or to a local intra-net, for example. In addition, the processor 124 may be a server or a server farm, for example, which is coupled to the storage unit 126 having access to the video database 106 and a tools database 140. The processor 124 may store a multi-dimensional content search program for operation on the processor 124. Alternatively, the processor 124 may store the multi-dimensional content search program to be downloaded to a workstation for workstation local operation. The multi-dimensional content search program may be stored as electronic media in the storage unit 126 on a high density disk drive, an optical disk drive, or the like. The program as a computer-readable medium may also be downloaded over a communication network, such as interface 140, from a remote network device, such as another server or mass storage unit.

Figure 1C:
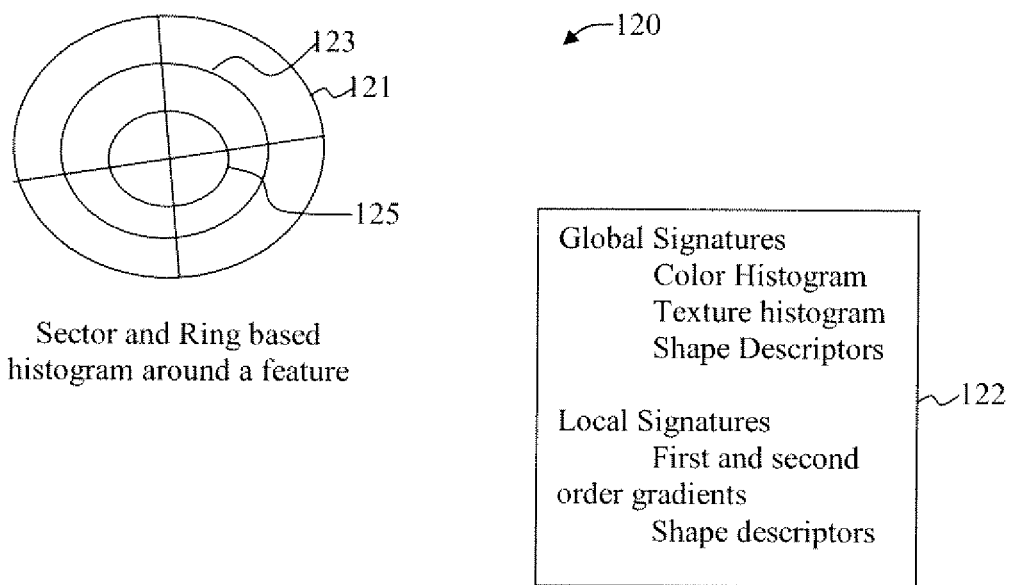
FIG. 1C illustrates some examples of regions of interest used to generate signatures from, and of some signatures to describe global and local features of image or video sequence or object in accordance with the present invention.

FIG. 1C shows several representations 120 of regions of interest and the types of signatures generated from processing video frames. The regions of interest can be circular rings 121, 123, and 125 or rectangles grids (not shown). The distance between the rings can be equidistant or be on log-polar scale. The signatures 122 that are generated can also be classified as global and local. Global signatures describe the overall content of the image or frame. The local signatures describe local features within the region of interest.

Figure 2A:
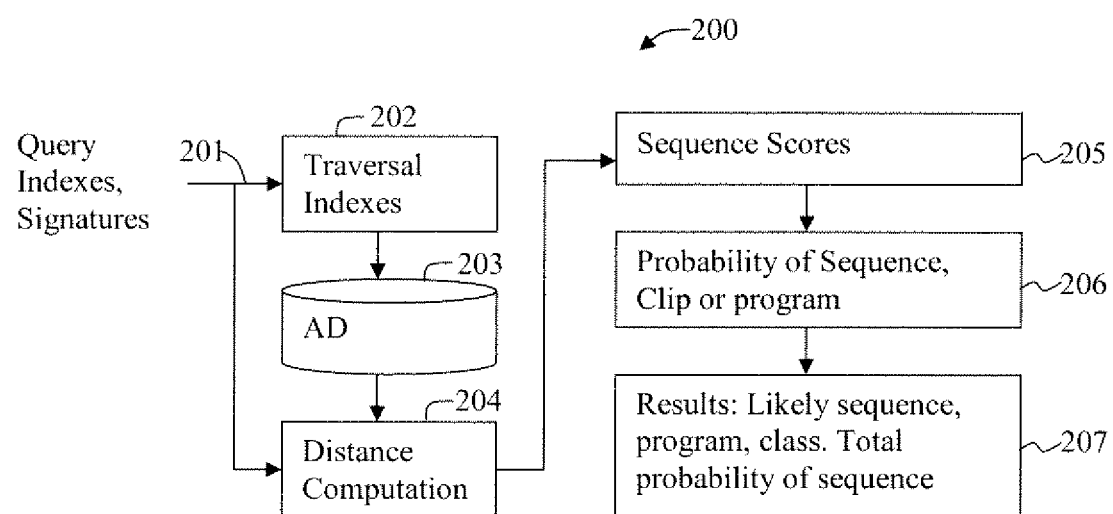
FIG. 2A illustrates a method to correlate a query video sequence to the video sequences in a database or to correlate subsequent images in a query object data cube with the object cubes in the database in accordance with the present invention.

FIG. 2A illustrates a method 200 used to correlate a query video sequence to the video sequences in a video database or to correlate subsequent images in a query object data cube with the object cubes in the database. For every selected frame in the query video sequence, a video database search is performed. The nearest video frames from the database collection for each query video frame are correlated to identify the highest likelihood of a video sequence match. Next, matching frames from the database for each query are correlated with the subsequent matching database frames for subsequent queries till a high correlation is obtained. One correlation factor relates similar gaps between the query frames to the gaps between the database matching frames. If the likelihood of a sequence match is high, as determined by the correlation, the likely candidate video sequence is selected for further processing.

In a preferred embodiment, a given set of query indexes and signatures 201 in FIG. 2A are derived from a query video sequence and used to identify a similar video sequence. For each query video sequence, certain frames are identified. For each of these selected frames signatures are generated for certain extracted features of the frame or frames around the selected frame. For each of the signatures, a traversal index is also generated. This traversal index is used to access the database efficiently. Also, the database of signatures of original videos is also indexed by the traversal indexes computed. The word traverse is typically used to describe the operations that involve the stepping or traversal from node to node of the database until the individual elements of the database are reached. The traversal indexes and the signatures are computed from features such as, the shape, motion, first and second order gradients in the sectors or other features or combination thereof, to identify likely frames or video sequence in step 202 of FIG. 2A. For each of the signatures and traversal indexes of the query, a range or a nearest neighbor search/query is performed. This database search operation involves database traversal and a list of likely entries in the database are identified that are within the search criteria. At step 203, a similarity search computation is performed, which involves reading the leaf nodes for associated data. Then, in step 204, the distance or error between the individual query signatures and database signatures is computed.

The distance measure is generally defined as $L_p$ normalized where p>1 and $L_1$ normalized is the sum of differences between a query signature vector (Q) and an original video signature vector (O) for each dimension of the signature vector. For example, $L_1$ (Query, Original)=sum (Qi−Oi) for all dimensions in a signature vector. Where Qi is the value of the query vector for the original video feature/frame in a given dimension i, and Oi is the value of the original video feature/frame vector for a given dimension i. Another distance measure is a Mahalanobis distance which is a statistical measure and takes into account correlations between variables.

Then, the operations of computing a correlation score between any potential segment of a query video sequence or a frame of the query video with the original video are performed in step 205. This step involves further correlations calculations to extend the correlation that is initially found when the signature level correlation for the query and original video is performed in step 204. This correlation is performed on sequences of query and original video frames or between specific features of the query and original video, or between query video frame and original video frame features. Additional computations can also be performed by using additional indexes or signatures such as texture, motion, and associated data such as location and size. The above correlations will identify a small set of likely matching video sequences or frames. For each likely matching video, the probability of matching between query and original video is calculated and a correlation score is generated in step 206. As described above, the signature level correlation scores from step 204 identify similar video frames between a query and an original video. In step 205, a sequence of signatures is correlated to increase the probability of a match between a query video sequence and an original video or a query frame, assuming many features signatures are available for the query frame, and the original video frame. Step 206 is analogous to a false positive analysis. For every likely matching of the original video with the query video, a more detailed correlation between the query video and original video is performed. This false positive analysis is performed between the matching video segments or matching video frames or various video features.

In a preferred embodiment, the computation of the correlation score of a sequence based on time correlation is described below.

corr_score_Q0_DB0 is the correlation score between a query video segment and original video segment.

$$\text{corr\_score\_}Q0\_DB0=\Sigma(\max(Eij*((Si-\text{sigma})(Sj-\text{sigma})/K)*(1-DTij)^2$$

where Eij=entropy between correlated queries i and j
Si=the similarity score of item "i" of the matching sequence between query and original video signatures
Sj=the similarity score of item "j" of the matching sequence between query and original video signatures
Sigma=the threshold score
The summation is from the first element to the last of matching signature pairs in a video sequence. Each signature pair consists of a query signature and an original video signature and their associated frame numbers.
DTij=is the frame correlation between queries i and j and the associated original video frames for the queries i and j $$DTij=|(QFRj-QFRi)-(DBFRj-DBFRi)|/((QFRj-QFRi)+(DBFRj-DBFRi))$$

where query j>query i; and where j is the next element that has a valid DB match in the query series: 0, 1, 2, . . . i, . . . j . . . .
a valid DB match is defined where (Si−sigma)>0 and the DTij>0.1
and where K is a constant
corr_score_Q0_DB0 is the correlation score between a query video segment and original video segment.

$$\text{seq\_score\_}Q0\_DB0\_WIN1=\text{sum}(\max(Eij*((Si-\text{sigma})(Sj-\text{sigma})/L)*\text{power}((1-(DTij),2))+A)$$

where L, A are constants
and where for WIN1: is a sequence window length; the sequence length is a programmed value that represents the length of the matching sequence. The threshold values for given sequence window length have been found experimentally or through learning.
Thresholding for sequences defined by a non-linear approximation
For given sequence window W $$\text{Thresh}=RATE*\text{power}((WIN),NL)$$

where RATE is constant;
where NL is constant≈0.5
In a preferred embodiment, the correlation score for a matching video sequence is computed as follows: compute a correlation score between two close matches of database frames of the same video sequence. Use the individual frame similarity score, use the frame distance correlation between query and database, and correlate the direction of change information in the query signatures to that of the candidate frames in the video sequence. Apply an appropriate weight on the query indexes. For unique information content, use the uniqueness of each signature, TF in video database 106 and the distances between the signatures in the queries.

Figure 2B:
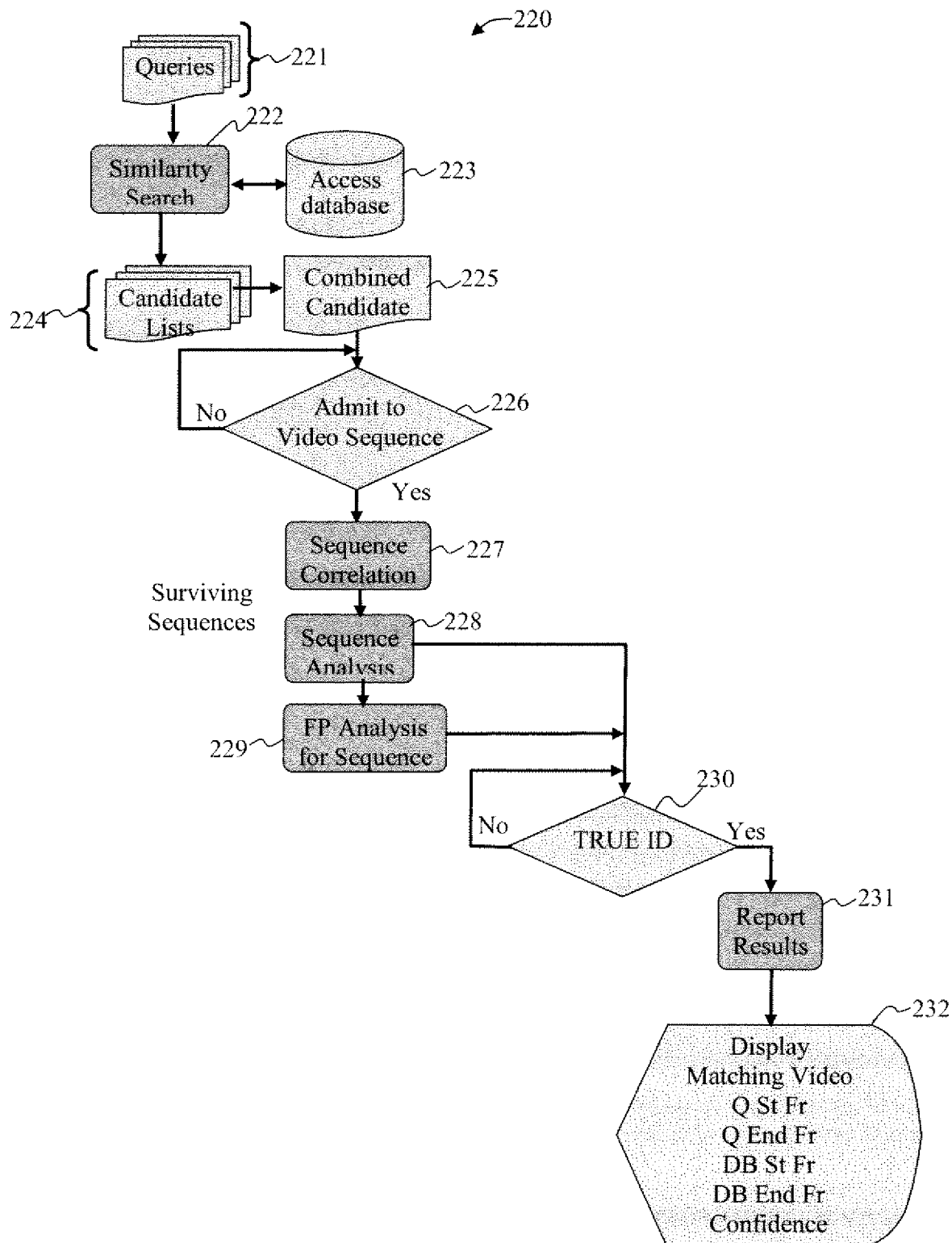
FIG. 2B illustrates an alternate method to correlate a query video sequence to the video sequences in a database or to correlate subsequent images in a query object data cube with the object cubes in the database in accordance with the present invention.

FIG. 2B illustrates a video search method 220 used to correlate a query signature sequence, obtained from a query video with the signature sequence in a video database. For every query video signature 221, a video database similarity search 222 is performed on databases, such as database 223. The nearest video frames signatures, also referred to as a candidate list in 224, are combined with candidates from searches with other signatures for a given query frame to form a combined candidate list 225. Some of these pairs in the combined list are selected in step 226 to be starting points of potential sequences. In step 226, the matching signature pairs with scores above a certain threshold or those which are in the top "n" list are admitted as the starting point of a new sequence. Next, in step 227, candidates from the combined candidate list for each query are correlated with the potential sequences determined in step 226. In step 228, a detailed sequence or frame analysis is performed by combining various sub-segments of correlated frames or frame segments of the query and the original video. Sequences whose score are above a first threshold are combined and evaluated in step 230. Sequences that are greater than a second threshold are evaluated in step 229. In step 229, a false positive analysis is performed for likely matching sequences obtained from step 228. In step 230, a thresholding decision is made on the likelihood of a matching sequence or sequences for both the combined sequences above the first threshold and the sequences above the second threshold that have passed the false positive test in step 229. Step 231 reports the results and selected results may be displayed in step 232 which shows a sample result list having a matching video name, a query start frame (Q St Fr), a query end frame (Q End Fr), an original video start frame (DB St Fr), an original video end frame (DB End Fr), and a likelihood of a match as a confidence value.

Figure 2C:
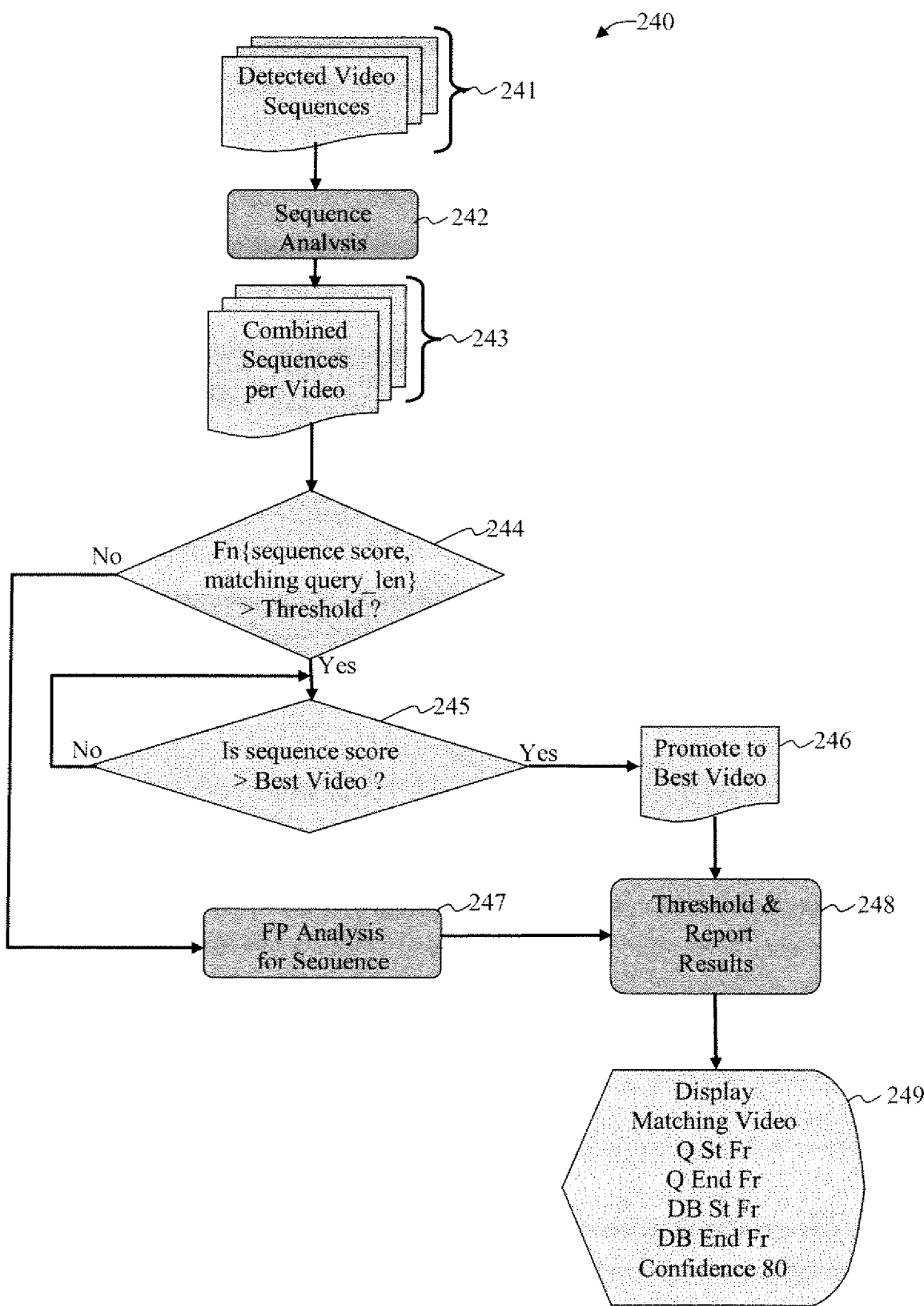
FIG. 2C illustrates an alternate method that takes as an input matching pairs of query and original video segments, and identifies matching original video segments for specific segments of the query video in accordance with the present invention.

FIG. 2C illustrates a video search method 240 used to evaluate a set of matching query signature sequences from a query video and matching original video sequences. For every query video sequence detected in step 241, a detailed sequence or frame analysis is performed in step 242 on the sub-segments of correlating frames or frame segments of query and original video. In step 243, the surviving detected sequences are combined into a list. In step 244 the combined sequences score is evaluated to determine if it is greater than a threshold. If so, the set of sequences of a given video are selected as a matching video. The scores for each video are evaluated in step 245 to determine the best matching video. The best matching video list is generated in step 246. The matching videos are added to a threshold and reporting unit in step 248. Step 247 performs false positive analysis on a set of best matching sequences. Selected results may be displayed in step 249.

Figure 3A:
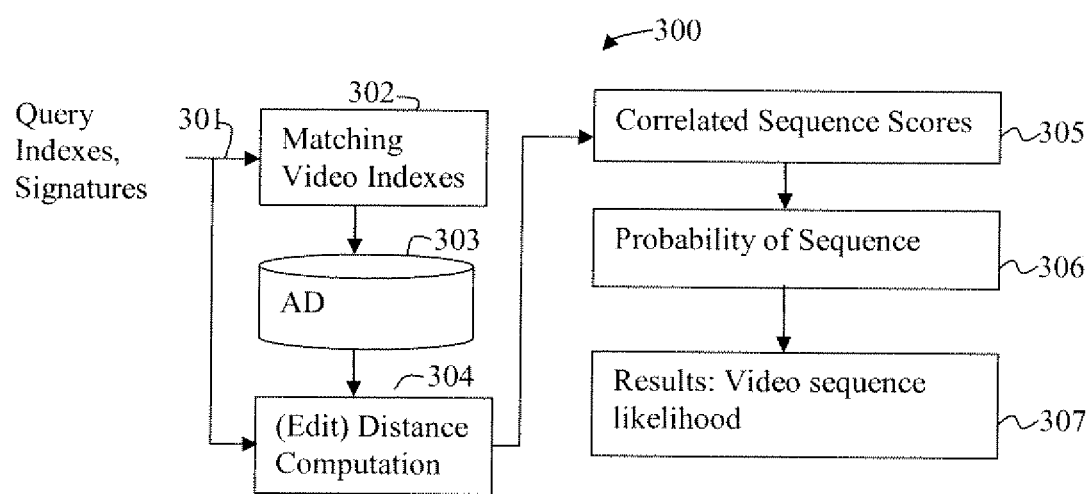
FIG. 3A illustrates a post processing method to determine, for the likely video sequence matching candidate, a confidence factor of the candidate sequence in accordance with the present invention.

FIG. 3A illustrates a post processing method 300 utilized to determine a confidence factor for a likely video sequence matching candidate of the candidate sequence. All the signatures of the candidate video, starting with an identified start frame, for each frame thereafter, and each identified frame or sequence, are compared with all the database signatures related to the query video sequence and correlation scores are generated.

One embodiment describes a method to correlate signatures within a video sequence to a database set to identify the likely matching video sequence. The embodiment also describes the method to correlate likely matching video sequences with all related signatures in database to decide a true match or confidence of the match.

A preferred embodiment of the post processing method 300 to increase the confidence of a video sequence matching candidate from database is shown in FIG. 3A and described below. A given set of query indexes 301 A derived from a query video sequence is received in step 301. In step 302, a database index is traversed for this set to access leaf nodes for associated data and associated indexes which are stored in step 303. Then, as described with regard to step 204 of FIG. 2 above, the distance between the individual query index and candidate database index and associated data is computed in step 304. An edit distance can be computed to obtain a more accurate correlation. For a shape signature, the edit distance is, for example, the sum of the pixel weights and the distance that needs to be traveled to make two signatures equal. Next, a correlation score for the single index or frame is computed in step 305 using additional indexes such as texture, motion, and associated data such as location and size to correlate each individual frame. The sequence probability scores for each query sequence or frame are calculated, as well as a correlation score in step 306 for the candidate sequence from various likely start frame positions. Using the above correlations of matching sequences, a final evaluation of the correlation between the candidate video and the query video is performed in step 307 to produce a video sequence likelihood. The likelihood is based on a score that is thresholded by a value that is calculated from the length of the sequence or the total information extracted from the video sequence. Using rules based on learning a probability, a confidence value is placed on the likelihood of a match.

Figure 3B:
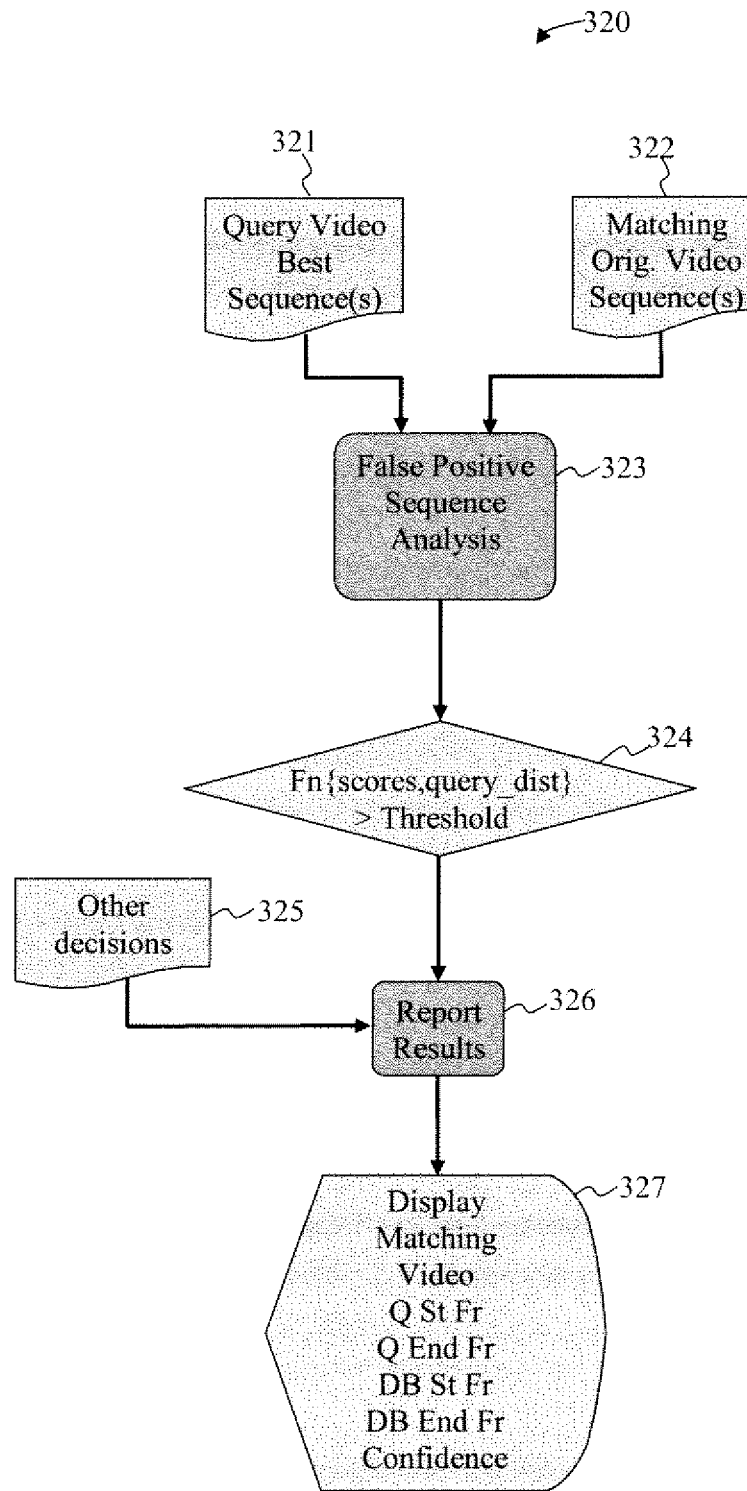
FIG. 3B illustrates a post processing method to determine the likelihood of a match between segments of query video and original video in accordance with the present invention.

FIG. 3B illustrates a post processing method 320 employed to determine if a matching segment of an original video 322 and a query video 321 are similar. All the signatures of the candidate video, starting with an identified start frame, for each frame thereafter, and each identified frame or sequence, are compared with all the database signatures related to the query video sequence and correlation scores are generated.

The sequence probability scores are calculated for each query sequence or frame and a correlation score is also calculated in step 323 for the candidate sequence from various likely start frame positions. The correlation scores calculated are compared in step 324 with a threshold that takes into account the total query information, for example Fn{scores, query_dist}>threshold. If the scores of the video sequence are greater than the threshold, the sequence is added to a list of matching sequences. The results are reported in step 326 and may utilize other analysis and decisions provided by step 325. Step 327 operates to display a rendering of results, where Q St Fr represents a query start frame, Q End Fr represents a query end frame, DB St Fr represents an original video start frame, DB End represents an original video end frame.

Figure 4:
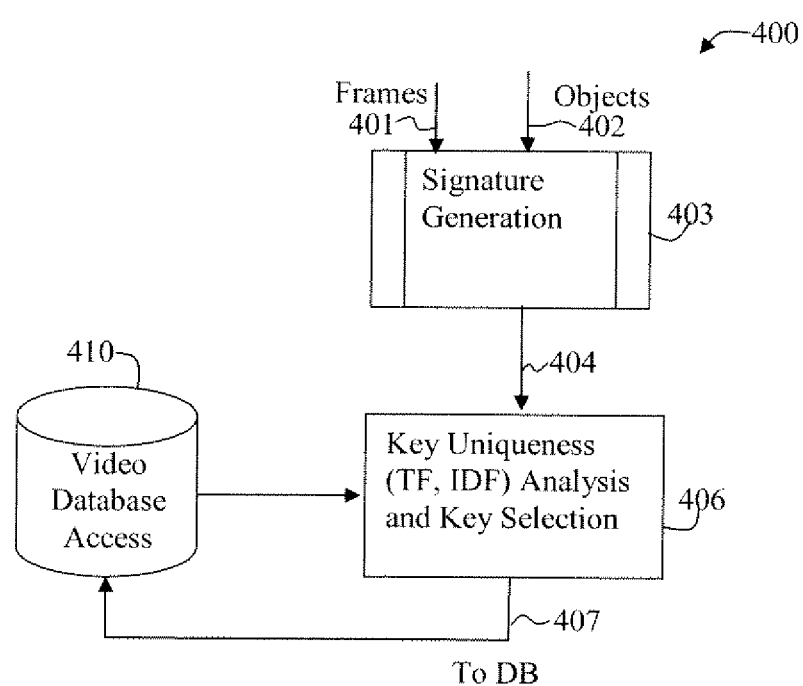
FIG. 4 illustrates a method used to select database signatures to increase information content such that the signatures optimize the likelihood of differentiating between the many video sequences stored in accordance with the present invention.

FIG. 4 illustrates a method 400 that may suitably be employed to select database signatures that are more unique so as to increase information content. These selected signatures optimize the likelihood of differentiating between the many video sequences stored. In a preferred embodiment to select high information signatures in the database, video frames 401 or objects 402, after image processing treatment of the video frames or objects, are further processed in step 403 to generate signatures. These signatures are compared in step 406 with database signatures accessed in step 410 from a video database, for example. Signatures with high information content relative to the rest of the signatures in the video database are retained. Based on the uniqueness of the signatures and other control parameters, such as priority of a video sequence, or total signatures present per video sequence, the selected keys are retained at output 407 and stored in step 410 to the video database.

One embodiment describes a method to select database information with high uniqueness. If the term frequency (TF) of signatures within a very small distance of the generated signature is large, this signature is not preferred. Another signature that includes more unique information is preferred for selection, the uniqueness is directly related to the number of similar signatures within a given distance measure.

In another preferred embodiment, two pass operations are performed to generate a high information content database. In the first pass, all candidate signatures are generated. Next, the total unique information content of each video sequence is evaluated. In the second pass, all signatures that do not have high information content and at the same time do not diminish the total unique information about each video sequence are not kept in the database. The database retains primarily high information content signatures that retain most of the differentiating information of each database element or video sequence. A measure of the uniqueness of each individual signature and a sum of unique signatures measured for a particular object or video clip are tracked so as to ensure sufficient information content is in database to be able to identify the video clip or object. In order to make a measure of unique information content within a query, or more specifically query video, is important to determine the error bounds of a matching original. For example, if the information content calculated by a summation of uniqueness of individual signatures within a selected segment of the query video is very high then the relative error bounds of a matching original video may be relatively high. This form of measurement is based on statistics and can be observed with actual test data.

One embodiment describes an architecture where the database is partitioned by pivots. Each pivot is clustered around a centre. The traversal indexes are built from each of the pivot. Alternatively each cluster could be described as a hash or locality sensitive hash value or a cluster centre value. The traversal indexes are built from the cluster signatures or values.

Figure 5:
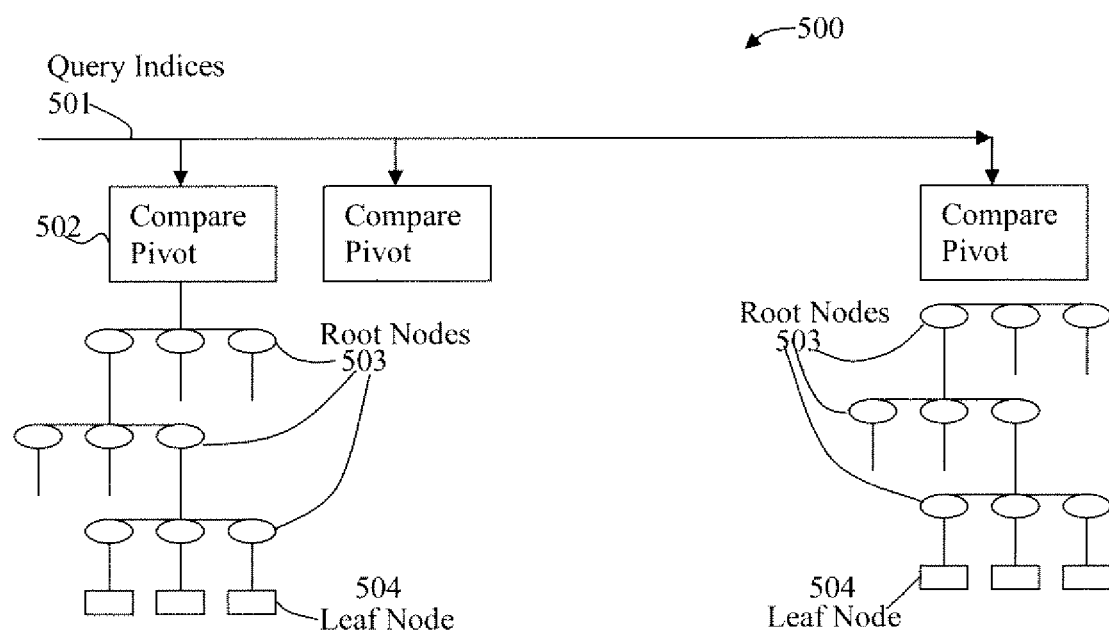
FIG. 5 illustrates an alternative organization of the database based on compare pivots centered around clusters of indexes of generated signatures in the database in accordance with the present invention.

FIG. 5 illustrates an alternative organization 500 of the database based on compare pivots centered around clusters of indexes of generated signatures in the database. In one preferred embodiment of the database architecture, the database is organized around pivots which are used as proxies for centers of each database cluster. The incoming query indexes 501 are compared against the compare Pivots 502 and then a tree traversal is followed though nodes 503 to leaf nodes 504. As used herein a pivot in a database refers to a central point around which other database points are organized.

Figure 6:
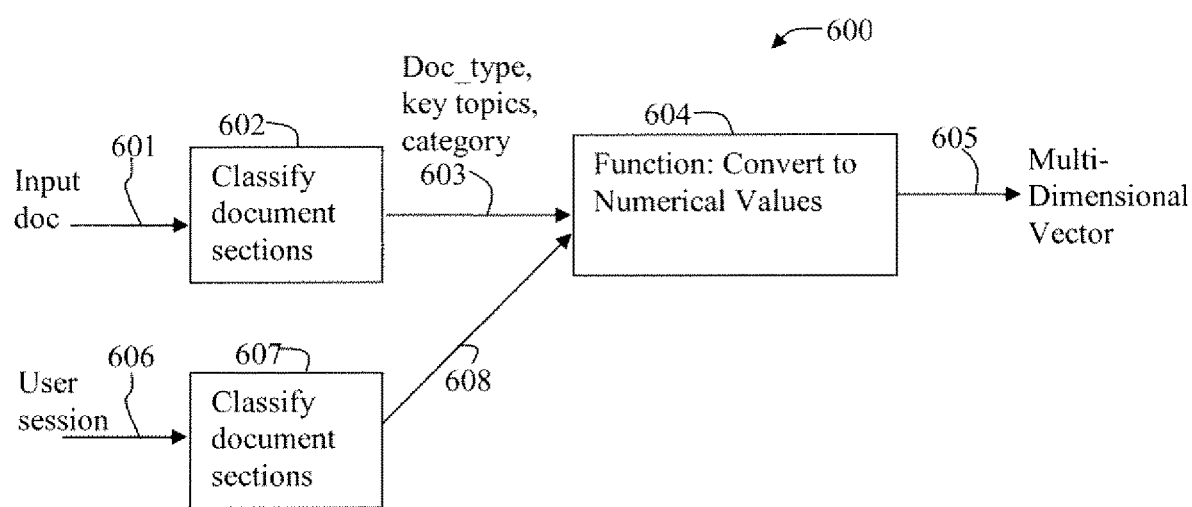
FIG. 6 shows an alternative method of converting documents or user sessions into multi-dimensional vectors which can be used to efficiently perform thorough lookup of similar documents or similar user sessions or similar events in accordance with the present invention.
Figure 7:
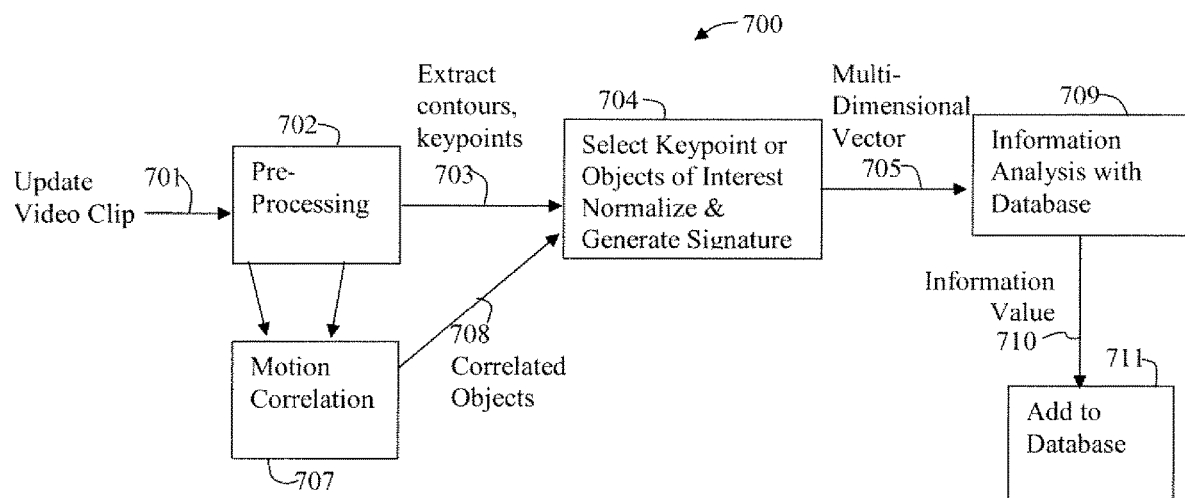
FIG. 7 shows a system application wherein an incoming updated or stored image sequence is processed to generate multi-dimensional vectors which are further analyzed for information content before adding them to a database in accordance with the present invention.
Figure 8:
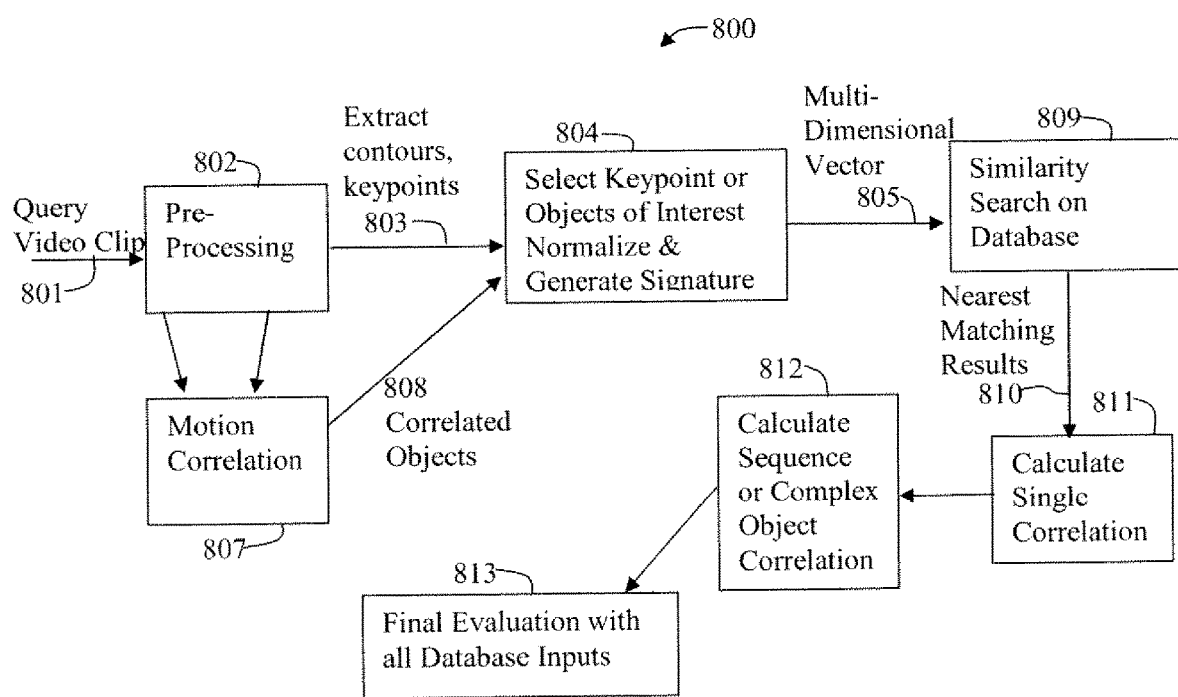
FIG. 8 shows a system application wherein the incoming query image sequence is processed to generate multi-dimensional vectors and used to perform a similarity search against a database for identification of a video clip or an object in accordance with the present invention.

FIG. 6 shows an alternative method 600 of converting documents or user sessions into multi-dimensional vectors which can be used to efficiently perform thorough lookup of similar documents or similar user sessions or similar events. This method could be used for any input including documents, events, images, natural situations or the like. The first step in using the input is to classify it into various aspects where each aspect provides a dimension. After classification, a multi-dimensional vector is used to describe the values for each class. For example, such values include a document type, such as a shopping list, a scholarly paper, a product review, a feedback document. In another example, a category may include, for example, a medical scholarly paper or a video of a medical procedure. Further dimensions could apply to personalities, topics, activities and the like.

The alternative method 600 includes, classifying an incoming document 601 into different aspects in step 602. A first set of dimensions 603 such as document type, category, classification, personalities, topics, activities are transferred as input to step 604. In a similar manner to step 602, an incoming user session information 606 may be classified into various activity types in step 607. A second set of dimensions 608 such as a combination of sequence of events, for example, a user session, and a classification of documents selected and of queries are transferred as input to step 604. The multi-dimensional vectors 603 and 608 are converted into numerical terms in step 604 to generate a multi-dimensional vector 605. The advantages of this method include a very efficient ability to add new documents to update a database, to find similar documents or duplicates and to perform searches of databases.

One embodiment describes a method to select information from various features to generate signature(s) for each frame. The method describes method to weight the features at corresponding x,y coordinates to generate a weighted segmented output for a set of selected keypoints or regions.

An alternative method 700 includes, receiving an incoming image sequence 701 and preprocessing it into different aspects in step 702. Results of the preprocessing in step 702 are further processed in step 707 in which correlation processing is performed to identify information between two images and to extract motion based information, including correlated contours. In step 702, weighted contours and keypoints 703 are generated and output for further processing. As used herein, weighted contours describe a weighted sum of various features extracted at a point on the contour. In step 707, motion segmented objects or correlated objects 708 are generated and output. Step 707 includes motion segmentation methods to create real valued contours of the motion segmented objects. In step 704, the multi-dimensional inputs from steps 702 and 707 are used as follows. Step 704 generates signatures for each region of interest, where a region of interest can be around a selected keypoint or a selected object or bounding boxes of a selected object, or for a frame. Selected signature generation methods, including generating shape signatures or weighted shape vectors, are used in step 704 to generate a multi-dimensional vector 705 for selected regions of interest. In step 709, a database search is performed to find uniqueness of each input and to generate information values 710 which are used to select which values are stored in step 711 in the final database. The final database is used for search operations for a query video.

An alternative method 800 includes, receiving an incoming image sequence 801 and preprocessing that sequence into different aspects in step 802. Results of the preprocessing in step 802 are utilized in step 807 where correlation processing is employed to identify information between two images and to extract motion based information, including correlated contours. Weighted contours and keypoints 803 are generated in process 802 for further processing. Correlated objects 808 are generated in process 807. The multi-dimensional inputs are converted using weighted contours and keypoint information to select area or objects of interest and, after normalization for orientation and diameter, are processed into numerical terms in step 804 to generate a multi-dimensional vector 805. In step 809, a database search is performed to find uniqueness. The nearest matching results 810 are used to generate a correlation scores in step 811 which are further processed to generate sequence correlation scores in step 812. The likely matching objects or video clips are again evaluated using all database signatures in step 813. This step 813 is generally referred to as false positive analysis. For efficient access of the database for false positive analysis, the database is indexed by video and frame numbers. The nearest results for each incoming image sequence which constitutes the query are stored as scores.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Upon reading this disclosure, those of skill in the art will appreciate still additional alternative systems and methods for a database query processor in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A computer-implemented method comprising:
   obtaining, by a processor, a query index that is derived from features of a frame of a query video;
   determining, by the processor, that a distance measure between the query index and a candidate database index of a reference database satisfies a threshold condition, wherein the candidate database index corresponds to a frame of an original video;
   based on the distance measure satisfying the threshold condition, determining, by the processor, a first time correlation score based on a comparison of signatures of a sequence of frames of the query video with respective signatures of a first sequence of frames of the original video, the first sequence of frames starting at a first start frame position;
   determining, by the processor, a second time correlation score based on a comparison of the signatures of the sequence of frames of the query video with respective signatures of a second sequence of frames of the original video, the second sequence of frames starting at a second start frame position that is offset from the first start frame position; and
   based at least on the second time correlation score, providing, by the processor, a results list that includes a name of the original video.

2. The computer-implemented method of claim 1, wherein the query index corresponds to a multi-dimensional query signature of the frame of the query video, wherein the candidate database index corresponds to a multi-dimensional database signature of the frame of the original video, and wherein the distance measure is a sum of differences in dimensions between the multi-dimensional query signature and the multi-dimensional database signature.

3. The computer-implemented method of claim 1, further comprising:
   determining that the second time correlation score is greater than the first time correlation score; and
   based on the second time correlation score being greater than the first time correlation score, selecting the second start frame position as an identified start frame position, wherein the results list further includes the identified start frame position.

4. The computer-implemented method of claim 1, wherein the name of the original video is stored at a leaf node corresponding to the candidate database index, and wherein the leaf node is addressable by the candidate database index.

5. The computer-implemented method of claim 1, wherein the query index corresponds to a global signature of a region of interest of the frame of the query video, wherein the region of interest comprises multiple sectors, and wherein the global signature represents features of respective sectors of the multiple sectors.

6. The computer-implemented method of claim 5, wherein the region of interest is a rectangular grid.

7. The computer-implemented method of claim 1, wherein the query index corresponds to local features of an area around a keypoint of the frame of the query video.

8. The computer-implemented method of claim 1, further comprising using the query index as a traversal index so as to identify candidate database indexes of the reference database that are within a range of the query index, wherein the candidate database index is one of the candidate database indexes.

9. The computer-implemented method of claim 1, further comprising determining the second start frame position based on the first start frame position.

10. A multi-dimensional content search system comprising:
    one or more processors; and
    a computer-readable medium having stored therein instructions that are executable by the one or more computers to cause the multi-dimensional content search system to perform functions comprising:
      obtaining a query index that is derived from features of a frame of a query video,
      determining that a distance measure between the query index and a candidate database index of a reference database satisfies a threshold condition, wherein the candidate database index corresponds to a frame of an original video, based on the distance measure satisfying the threshold condition, determining a first time correlation score based on a comparison of signatures of a sequence of frames of the query video with respective signatures of a first sequence of frames of the original video, the first sequence of frames starting at a first start frame position, determining a second time correlation score based on a comparison of the signatures of the sequence of frames of the query video with respective signatures of a second sequence of frames of the original video, the second sequence of frames starting at a second start frame position that is offset from the first start frame position, and based at least on the second time correlation score, providing a results list that includes a name of the original video.

11. The multi-dimensional content search system of claim 10, wherein the query index corresponds to a multi-dimensional query signature of the frame of the query video, wherein the candidate database index corresponds to a multi-dimensional database signature of the frame of the original video, and wherein the distance measure is a sum of differences in dimensions between the multi-dimensional query signature and the multi-dimensional database signature.

12. The multi-dimensional content search system of claim 10, wherein the functions further comprise:
determining that the second time correlation score is greater than the first time correlation score; and
based on the second time correlation score being greater than the first time correlation score, selecting the second start frame position as an identified start frame position, wherein the results list further includes the identified start frame position.

13. The multi-dimensional content search system of claim 10, wherein the name of the original video is stored at a leaf node corresponding to the candidate database index, and wherein the leaf node is addressable by the candidate database index.

14. The multi-dimensional content search system of claim 10, wherein the query index corresponds to a global signature of a region of interest of the frame of the query video, wherein the region of interest comprises multiple sectors, and wherein the global signature represents features of respective sectors of the multiple sectors.

15. The multi-dimensional content search system of claim 14, wherein the region of interest is a rectangular grid.

16. The multi-dimensional content search system of claim 10, wherein the query index corresponds to local features of an area around a keypoint of the frame of the query video.

17. A non-transitory computer-readable medium having stored therein instructions that are executable by one or more processors to cause a computing device to perform functions comprising:
obtaining a query index that is derived from features of a frame of a query video;
determining that a distance measure between the query index and a candidate database index of a reference database satisfies a threshold condition, wherein the candidate database index corresponds to a frame of an original video;
based on the distance measure satisfying the threshold condition, determining a first time correlation score based on a comparison of signatures of a sequence of frames of the query video with respective signatures of a first sequence of frames of the original video, the first sequence of frames starting at a first start frame position;
determining a second time correlation score based on a comparison of the signatures of the sequence of frames of the query video with respective signatures of a second sequence of frames of the original video, the second sequence of frames starting at a second start frame position that is offset from the first start frame position; and
based at least on the second time correlation score, providing a results list that includes a name of the original video.

18. The non-transitory computer-readable medium of claim 17, wherein the query index corresponds to a multi-dimensional query signature of the frame of the query video, wherein the candidate database index corresponds to a multi-dimensional database signature of the frame of the original video, and wherein the distance measure is a sum of differences in dimensions between the multi-dimensional query signature and the multi-dimensional database signature.

19. The non-transitory computer-readable medium of claim 17, wherein the functions further comprise:
determining that the second time correlation score is greater than the first time correlation score; and
based on the second time correlation score being greater than the first time correlation score, selecting the second start frame position as an identified start frame position, wherein the results list further includes the identified start frame position.

20. The non-transitory computer-readable medium of claim 17, wherein the name of the original video is stored at a leaf node corresponding to the candidate database index, and wherein the leaf node is addressable by the candidate database index.

* * * * *